I. S. KALLIS & J. BERG.
TRUNK.
APPLICATION FILED NOV. 2, 1908

926,195.

Patented June 29, 1909.
2 SHEETS—SHEET 1.

Witnesses

Inventors
I. S. Kallis
J. Berg
By _____ Attorney

I. S. KALLIS & J. BERG.
TRUNK.
APPLICATION FILED NOV. 2, 1908.
926,195.
Patented June 29, 1909.
2 SHEETS—SHEET 2.
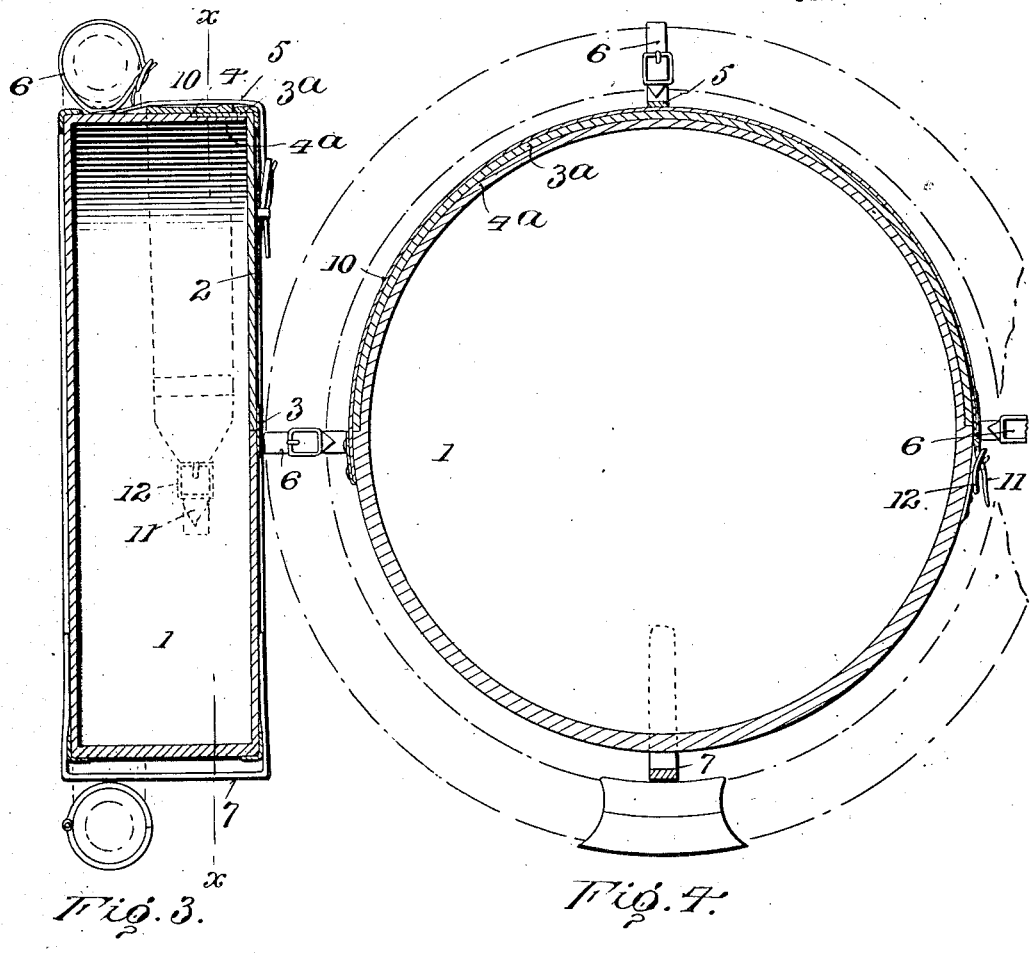
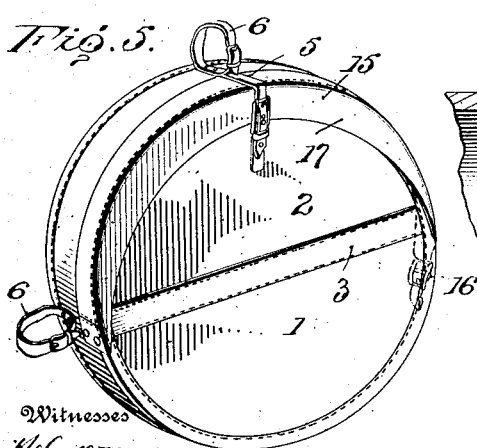
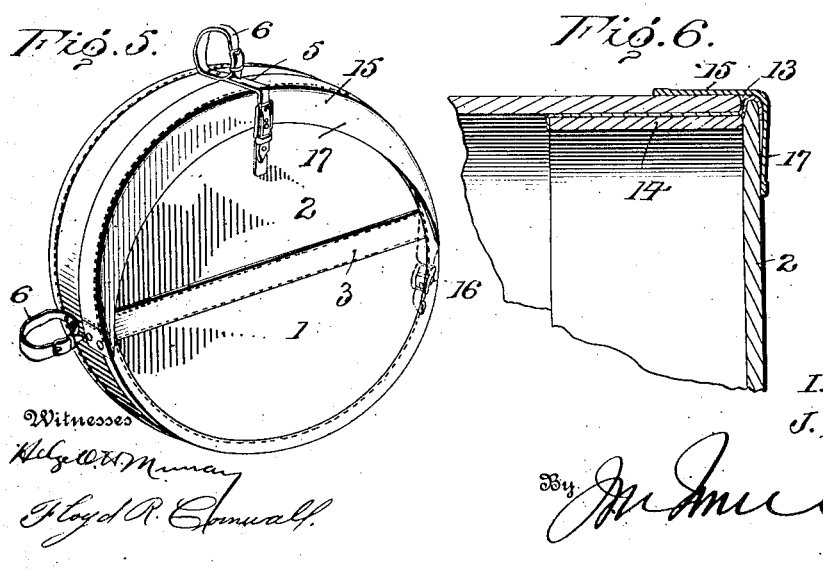
Witnesses
Inventors
I. S. Kallis
J. Berg
By
Attorney

UNITED STATES PATENT OFFICE.

ISIDORE S. KALLIS, OF NEW YORK, AND JOSEPH BERG, OF BROOKLYN, NEW YORK.

TRUNK.

No. 926,195.          Specification of Letters Patent.          Patented June 29, 1909.

Application filed November 2, 1908. Serial No. 460,686.

*To all whom it may concern:*

Be it known that we, ISIDORE S. KALLIS, a citizen of the United States, residing at New York, county of New York, State of New York, and JOSEPH BERG, a citizen of the United States, residing at Brooklyn, in the county of Kings and State of New York, have invented certain new and useful Improvements in Trunks, of which the following is a specification.

This invention relates to improvements in what is commonly known to the automobile trade as a tire trunk.

Owing to the fact that almost all available space on an automobile is taken up by the mechanism, it is essential that provision be made to accommodate compartments for wearing apparel or the like. Attempts have been made to locate a trunk like structure inside the extra tire usually carried on an automobile but dissatisfaction has arisen owing to the fact that dust and moisture work in the joints and thereby ruin the goods.
According to our invention, we provide a trunk of this character, and conveniently arrange the closure to make the inside accessible, and protect the joint between the closure and the body of the trunk against dust and moisture. In other words we provide a dust and water proof trunk, to insure protection of the goods being carried.

In practice, when carrying trunks of this character, it has been found, the bottom portion which contacts with the tire, or the tire holder becomes worn and eventually destroys the bottom of trunk material at this point. This is due to the constant jolting and consequent friction between the parts, and it is our aim to cure this defect by providing a support on the bottom of the trunk to receive the wear, and thereby protect the adjacent part.

The invention comprehends improvements in the particular details of construction and arrangement of parts, which will be hereinafter referred to and particularly pointed out in the claims.

Figure 1:
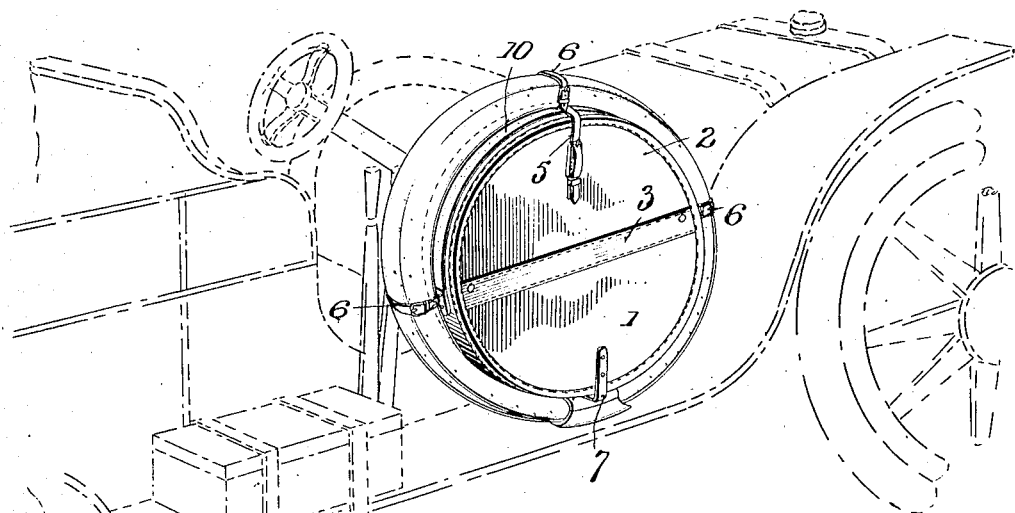
Figure 2:
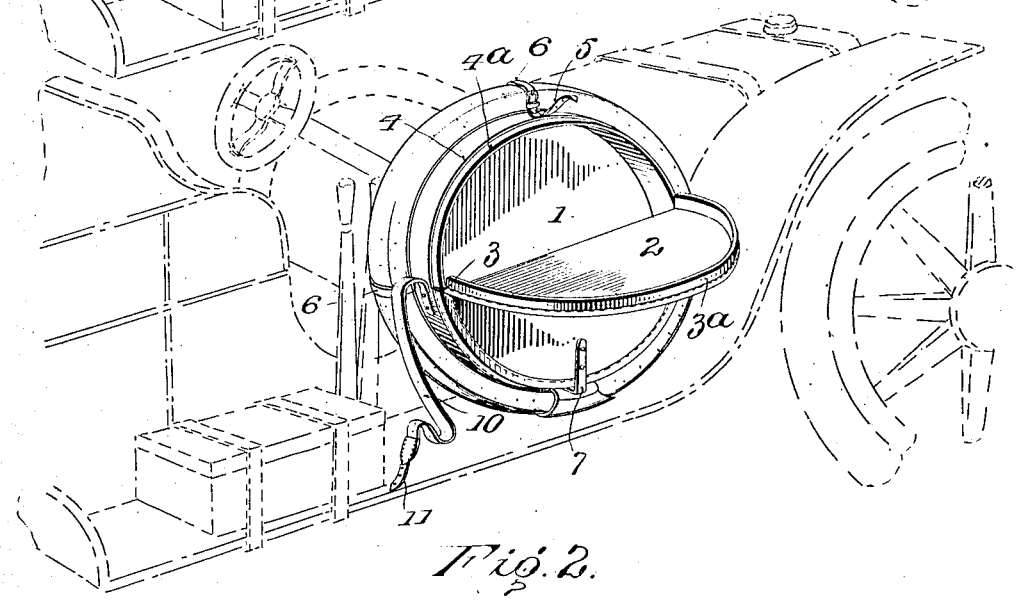

In the drawings:—Figure 1, is a perspective view of our improved trunk, applied to an automobile tire, the outline of an automobile being shown in dotted lines. Fig. 2, is a similar view, with the closure thrown open, Fig. 3, is a transverse section of the trunk, the tire being indicated in dotted lines. Fig. 4, is a vertical section on the line $x-x$ Fig. 3. Fig. 5, is a perspective view of a slightly different form of the invention. Fig. 6, is a transverse section of the same.

1, indicates a trunk of circular formation, and preferably made of leather or similar material. A closure 2, is hinged to the front of the trunk, along the line 3, the outer portion of the closure having a flange $3^a$, adapted to fit over the reduced front edge $4^a$, of the trunk, and abutting against the edge 4, of the trunk wall. The closure may be locked to the trunk by means of a strap and buckle 5, or other suitable fastening device.

Secured at intervals on the periphery of the trunk are straps 6, designed to embrace the extra tire, usually carried by automobiles. These straps are used for the purpose of fastening the trunk to the tire, as will be obvious by an inspection of the drawings.

To the underside of and extending entirely across the trunk is permanently fastened a foot of metal or other material or support 7. This support is for the purpose of relieving the friction and constant wear between the trunk and the tire, and also serves to coöperate with the straps 6, to properly locate the trunk inside the tire.

In order to make the joint between the closure and the trunk water and dust proof, we attach to the trunk a flexible band 10, adapted to be drawn tightly and snugly over the joint. This band may be elastic, or of any other flexible and water proof material, and is provided at its free end with a strap 11, to engage a buckle 12. In addition to serving as a protector for the joint, the band assists in holding the closure tight in to the trunk. The pressure inward of the band, clamps the flange of the closure tight against the reduced portion $4^a$, and even if the joint were loose, this clamping action would prevent the admission of dust or moisture.

In Figs. 4 and 5, we have illustrated a slightly different form of the invention. The joint between the closure and trunk is on the edge, as indicated at 13, and the flange 14 fits inside the trunk. The band 15, is permanently attached to the trunk and is provided with a fastening device 16, similar to the fastening device previously described. The band in this instance is provided with a depending face piece or flange 17, which extends down over the face of the closure to shed the water and dust falling on the band. This band structure effectually protects the edge joint from dust and moisture, the action of binding being substantially the same as the band shown in Fig. 1.

The invention is extremely simple, and will positively prevent goods carried in the trunk becoming soiled, by dust or water.

What we claim is:

1. An automobile trunk comprising a body portion and a closure therefor, a flexible band secured to the body portion and lying lengthwise over the joint formed between the body portion and closure, means located at the end of the band for detachably fastening said band, and a strap and buckle for locking the closure, said strap being located over and bearing directly on the flexible band.

2. A trunk comprising a body portion and hinged closure, said body having an intermediate reduced flange longitudinal of and underlying the joint formed by the adjacent edges of the hinged closure and body portion, a flexible band permanently secured to the body portion beyond the aforesaid joint and extending parallel with the latter, and a buckle permanently secured to the opposite side of the body portion and below the said joint for holding the adjacent sides of the body of the band snugly over the parallel edges of the joint.

3. A trunk comprising a round body portion formed with an opening on one face, a closure hinged to the face of the body portion to cover the opening, a flexible band secured on the periphery of the body portion below the joint formed by the meeting edges of the body portion and the hinged closure, and means on the opposite side of the body portion for detachably securing the opposite end of the band, so that as said band is drawn taut it will be held parallel with and snugly fit over the adjacent edges of the closure and the body portion.

In testimony whereof we affix our signatures in presence of two witnesses.

ISIDORE S. KALLIS.
JOSEPH BERG.

Witnesses:
  JNO. IMIRIE,
  RAY WILLIAMS.